March 6, 1934.  J. E. TSAVARIS  1,950,278
AUTOMATIC VEHICLE SIGNAL
Filed March 9, 1932    3 Sheets-Sheet 1
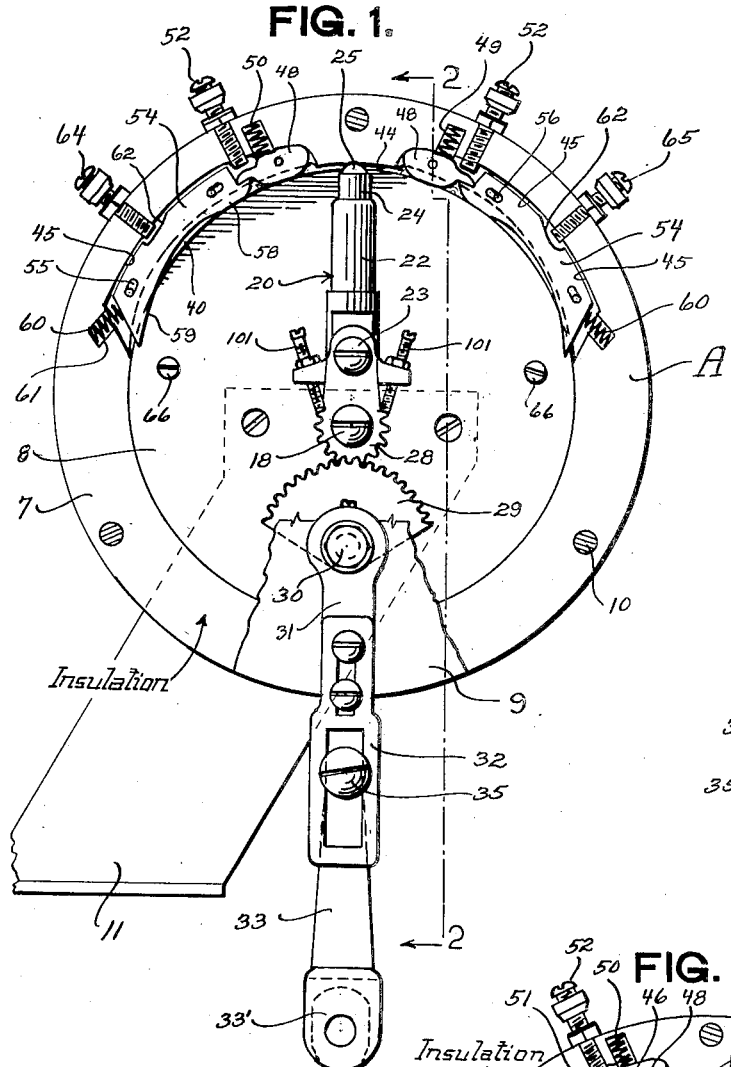
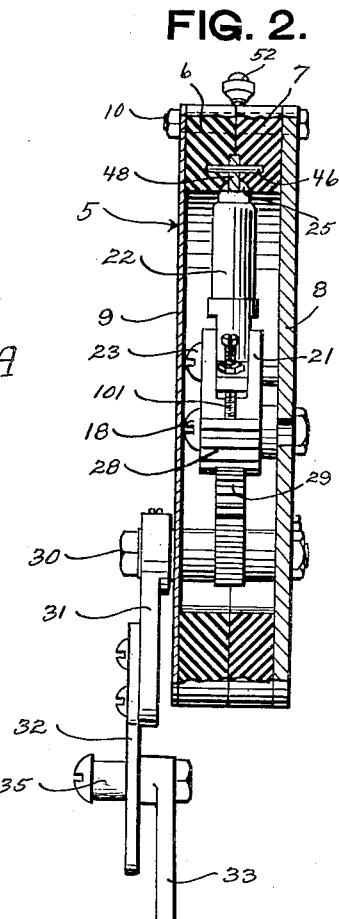
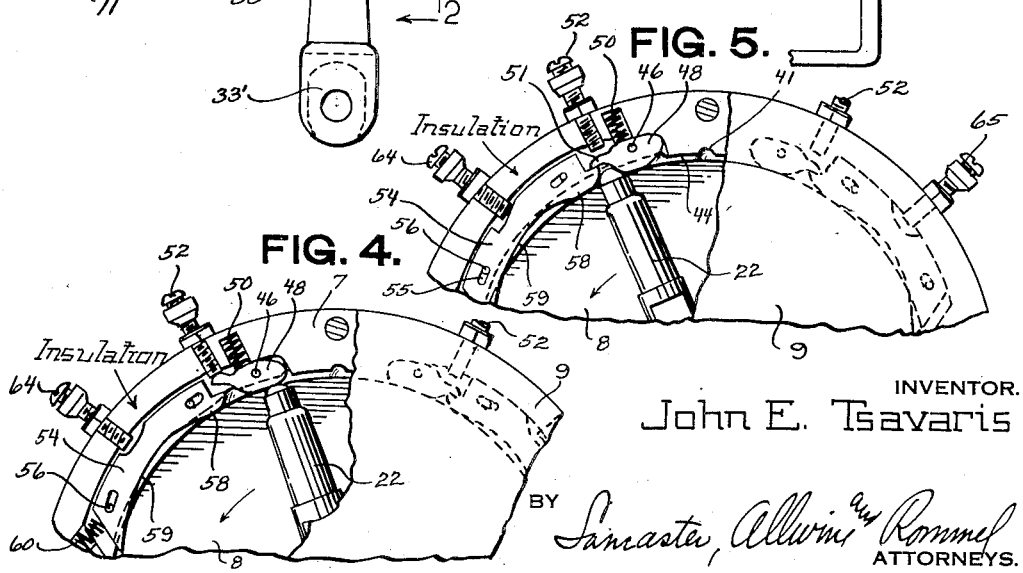
INVENTOR.
John E. Tsavaris
BY Lancaster, Allwine and Rommel
ATTORNEYS.

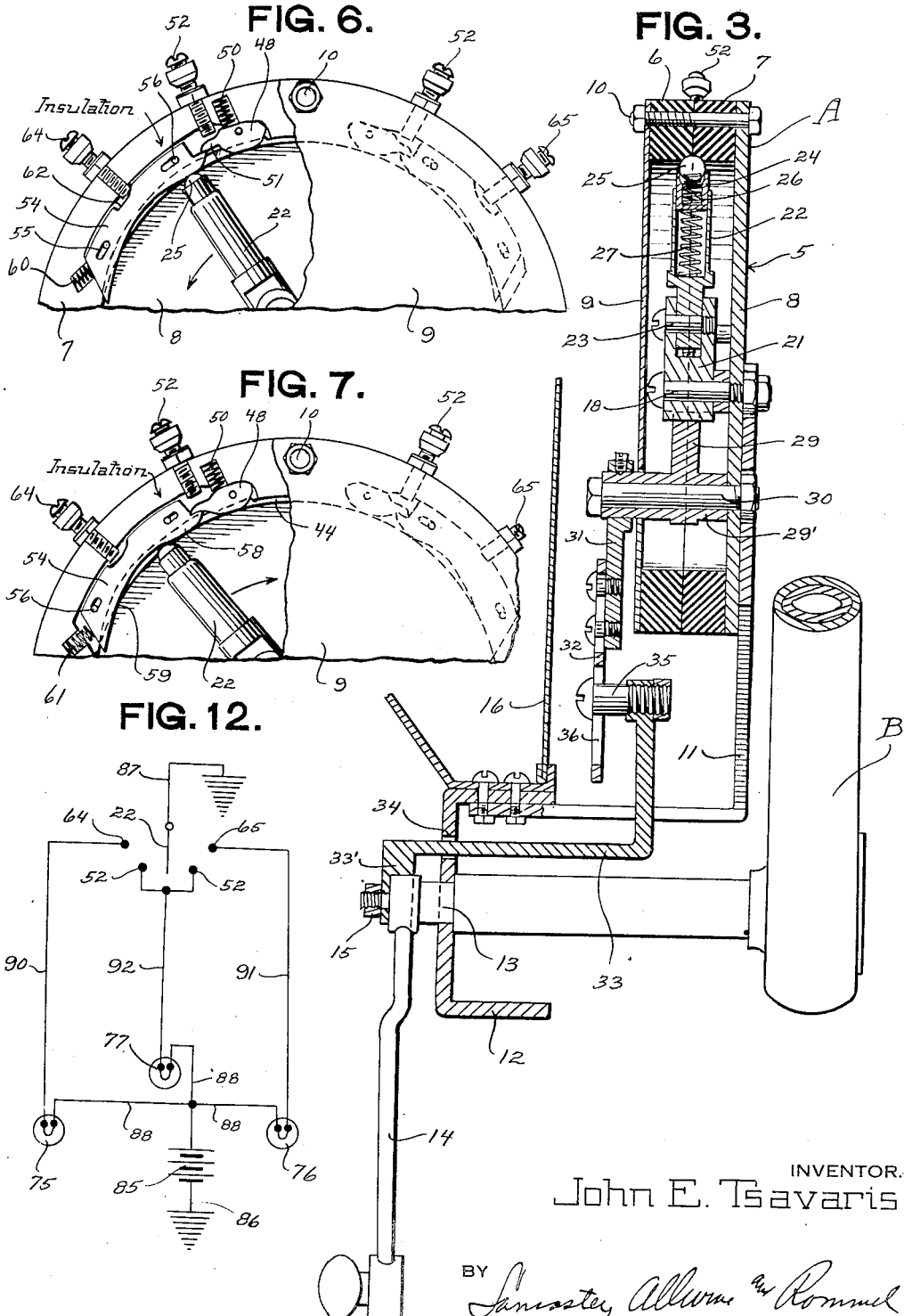

March 6, 1934.　　　　J. E. TSAVARIS　　　　1,950,278
AUTOMATIC VEHICLE SIGNAL
Filed March 9, 1932　　　3 Sheets-Sheet 3

INVENTOR.
John E. Tsavaris
BY
*Lancaster, Allwine Rommel*
ATTORNEYS.

Patented Mar. 6, 1934

1,950,278

UNITED STATES PATENT OFFICE 1,950,278

AUTOMATIC VEHICLE SIGNAL

John Emmanuel Tsavaris, Tarpon Springs, Fla.

Application March 9, 1932, Serial No. 597,817

10 Claims. (Cl. 200—4)

The present invention relates to vehicle direction signals and the primary object of the invention is to provide an automatic vehicle signal which is entirely automatic in its operation for controlling signal devices indicating the course of travel to be taken by the vehicle.

A further object of the invention is to provide an automatic vehicle signal which will relieve the driver of the vehicle from manually opening or closing signal controlling switches.

A further object of the invention is to provide an automatic vehicle signal actuated by the steering mechanism for displaying a caution signal in advance of the direction signals, said caution signal being cut out at the instant the direction signal is given and which caution signal is not again given during return of the automatic switch device to a neutral position.

A further object of the invention is to provide an automatic vehicle signal operable from the steering mechanism in a manner to prevent displaying of any signals until after a predetermined change in course of travel has been made and at which time a caution signal will be displayed in advance of the direction signals.

A still further object of the invention is to provide an automatic vehicle signal switch embodying a novel arrangement of pivoted and sliding contact members actuated by a single contact arm for controlling electrical circuits to an indicator of novel construction.

A still further object of the invention is to provide an automatic vehicle signalling switch embodying caution and direction signals automatically operable from the steering mechanism to display a caution signal in advance of the direction signals and which caution signal is not again displayed upon return of the vehicle to a straight path of travel.

Other objects and advantages of the invention will be apparent during the course of the following detailed description, taken in connection with the accompanying drawings forming a part of this specification and in which drawings:—

Figure 1 is a plan view of the switch or circuit controlling device showing the cover plate removed and the switch in the neutral or open circuit position.

Figure 2 is a section substantially on the line 2—2 of Figure 1.

Figure 3 is a central vertical section thru the switch and showing the manner of operating the switch from the steering mechanism of the vehicle.

Figure 4 is a fragmentary view showing the switch arm in a position for completing a circuit to a caution signal.

Figure 5 is a fragmentary view showing a further advanced movement of the switch arm for opening the caution signal circuit and closing one of the direction signal circuits.

Figure 6 is a fragmentary view showing a still further advanced movement of the switch arm from that shown in Figure 5.

Figure 7 is a fragmentary view showing the switch arm in a return position of travel for opening the signal circuit to one of the direction signals.

Figure 12 is a wiring diagram of the signal system.

Referring to the drawings in detail and wherein similar reference characters designate corresponding parts thruout the several views, the letter A designates a switch or circuit controlling device adapted to be actuated by the vehicle steering mechanism B to control circuits to the indicator C.

Figure 9:
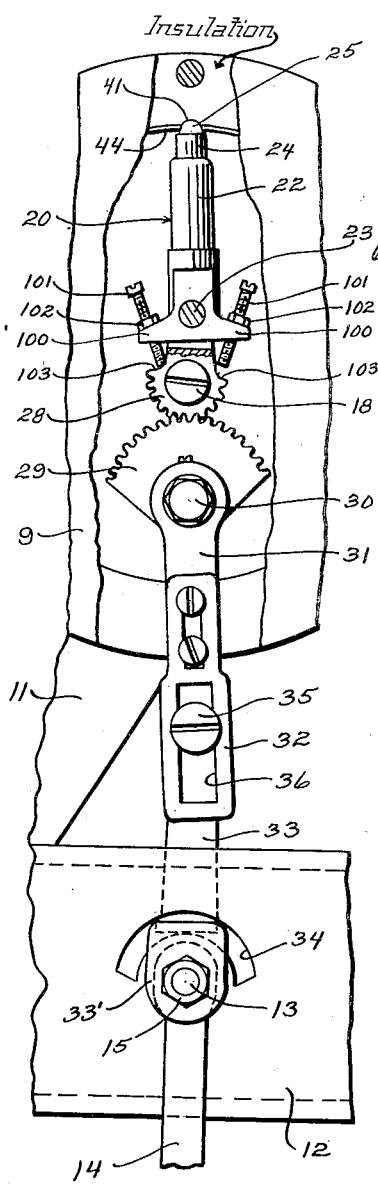
Figure 9 is a detail view showing the manner of adjusting the switch arm to permit greater movement thereof before closing of the caution signal circuit.

The switch A comprises a switch housing or casing 5 including an insulating ring embodying a companion pair of contact mounting rings 6 and 7 formed of any suitable insulating material. This annular contact mounting formed by the rings 6 and 7 is closed at one side by a mounting plate 8 and at its opposite side by a cover plate 9, the rings and plates being held in assembled relation by coupling bolts 10 preferably having threaded engagement thru the ring 6 to prevent separation of the insulating rings upon removal of the cover plate 9.

While the switch device A may be mounted at any suitable location for actuation by the steering mechanism of the vehicle, in the example shown the switch is mounted by a bracket 11 to one of the side channels 12 of the vehicle frame at a point adjacent the steering gear shaft 13. Secured to the outer end of the shaft 13 is the usual steering arm 14 held against rotation on the shaft by the nut 15. The switch is mounted inwardly of the hood 16 of the vehicle as clearly shown in Figure 3.

Journaled in the casing 5 as upon a pivot bolt 110

18 is a movable contact device 20 including a hub portion 21 and a tubular switch arm 22 joined to the hub portion 21 by a screw 23 having its axis extending parallel to the axis of the bolt 18. Arranged in the outer end of the tubular switch arm 22 is a cup 24 for receiving a metal contact ball 25 normally urged outwardly by a spring 26. The spring 27 in the tubular switch arm 22 acts to normally urge the cup 24 outwardly whereby the contact ball 25 is normally urged against the inner side of the annular mounting formed by the insulating rings 6 and 7. By observing Figures 2 and 3 it will be seen that the contact ball 25 has movement on the pivot 18 in the plane of the abutting edges of the insulating rings 6 and 7.

The hub portion 21 of the contact device is provided with a toothed sector 28 normally engaging a toothed sector 29 having its hub portion journaled upon a bolt 30 supported from the mounting plate 8 in direct alignment beneath the pivot 18. The hub portion 29' of the sector 29 projects thru an opening in the cover plate 9 and secured against rotation on the projecting hub portion is a lever arm 31 having an adjustable portion 32 whereby the length of the arm may be varied. Secured by one leg to the outer end of the steering arm shaft 13 is a Z crank 33 which extends inwardly thru an arcuate slot 34 provided in the channel 12. The upstanding arm at the inner end of the crank 33 carries a pin 35 for movement in a slot 36 provided in the adjustable lever arm portion 32. The outer downturned leg 33' of the crank 33 is recessed at its inner side to receive the coupling end of the steering arm 14, and the nut 15 for normally holding the steering arm to the steering arm shaft serves to retain the crank for swinging movement with the steering arm. Thus, when the arm 14 is swung by the steering mechanism, swinging movement will be imparted to the contact device 20, and the degree of swinging movement of the contact device will vary in accordance with the degree of swinging movement of the steering arm. When the steering arm 14 is in a position holding the steering wheels of the vehicle in a straight ahead path of travel, the contact device 20 will be in a central or neutral position midway between the contacts to be engaged by the contact device. The operating means between the steering means and switch may of course vary in accordance with the particular part of the steering mechanism to which the switch is coupled for operation.

Figure 8:
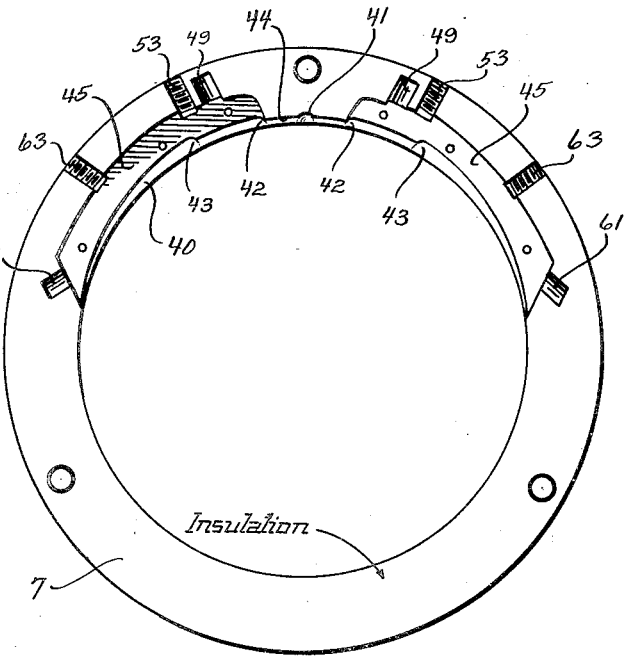
Figure 8 is a plan view of one of the contact mounting rings of the switch device.

The annular contact mounting ring formed by the rings 6 and 7 is formed with an internal arcuate groove or track 40 of substantially semicircular shape in cross section with one half of the track formed in each of the rings 6 and 7. The track 40 is provided midway its ends and at the neutral or off position of the contact device 20 with a semi-circular shaped depression 41 into which the metallic contact ball 25 is urged when the switch is in its central off position. Spaced equidistant at each side of the center depression 41, the track 40 is provided with steps 42 provided by enlarging and deepening the track and beyond each step 42 the track is provided with a second step 43. Formed at each side of the shallow central insulating track portion 44 is a flat, substantially arcuate shaped pocket 45 and these pockets are formed, one half in each of the ring sections 6 and 7. These pockets 45 as will be observed in Figure 8 open along the track 40 and extend from the steps 42 to the ends of the track.

Pivotally mounted in the adjacent ends of the pockets 45 as upon suitable pivot pins 46 is a pair of cam contact members 48 having their cam surfaces projecting into the tracks 40 between the steps 42 and 43 to be engaged by the contact ball 25. The insulating rings 6 and 7 are provided at their abutting sides with semi-circular shaped recesses 49 which when the rings are assembled form spring seat pockets for receiving coil springs 50 acting upon the cam contact members 48 to normally urge the contact members to an off position. The contact cam members 48 are each of like construction and are provided at their ends disposed adjacent the steps 43 with contact finger 51 for electrical contact with radially disposed contact terminals 52. These contact terminals 52 are preferably threaded into the insulating rings with their inner ends projecting slightly into the base of the pockets 45 to be engaged by the contact fingers 51 when the contact members 48 are swung by the movable contact device 20. This threading of the contact terminals 52 into the insulating rings allows for adjustment of the terminals with respect to the contact fingers 51. The threaded openings 53 for the terminals 52 are formed half in each of the rings 6 and 7. Mounted in each of the pockets 45 beyond the pivoted contact members 48 is a sliding contact member 54 each of which is provided with elongated slots 55 thru which retaining pins 56 extend for slidably retaining the contact members in their respective pockets and permitting limited sliding movement of the contact members in a direction substantially circumferentially of the mounting rings. This pin and slot mounting of the contact members 54 permits limited sliding movement of the members toward and from their respective pivoted contact members 48. The inner edges of these elongated contact members 54 extend into the track groove 40 and are provided adjacent the contact members 48 with a cam projection 58. Beyond the cam projection 58 the inner edge of each sliding contact member is formed with a cam surface 59 having a radius less than that of the arcuate track groove 40. It may here be well to note that the pivot 18 of the contact device 20 is arranged below the axis of the mounting rings 6 and 7 and this arrangement aside from causing the contact device 20 to act properly upon the cam surfaces 59 for imparting closing movement to the sliding contact members 54, also tends to center the contact device in an off or neutral position since the spring pressure on the contact ball 25 will be least when the switch arm is in a central position as in Figure 1. To reduce friction, the outer edges of the sliding contacts 54 are spaced from the base of the pockets 45, the contacts having sliding movement on the retaining pins 56. A coil spring 60 arranged in a pocket 61 at the end of each contact pocket 45 acts to normally move the sliding contacts 54 to an off position toward the pivoted contacts 48. Formed in the outer edge of each sliding contact member 54 is a notch 62 being beveled along one side with the beveled side of the notch toward the contacts 48. The meeting or abutting edges of the mounting rings 6 and 7 are provided with aligning, radially extending openings 63 which open into the pockets 45 at the beveled notches 62 in the sliding contact members 54. These threaded openings 63 receive threaded contact terminals 64 and 65 having their inner ends projecting slightly into the contact pockets to be engaged by the beveled edges of the notches 62 when the contact members are moved longitudinally to a circuit closing position by the contact device 20. By observing Figure 1, it will be seen that when the switch is in an off position, the pivoted contacts 48 are out of contact with their contact terminals 52 and the contact terminals 64 and 65 are out of electrical contact with their respective sliding contacts 54. It will also be noted from Figure 1 that the contact members 48 and 54 are duplicated in reverse relation at each side of the shallow insulating track portion 44 so that the contact ball 25 will act in a similar manner upon the contacts when moved to either side of its neutral or off position.

Suitable stop pins 66 are provided to limit swinging movement of the switch arm 22 so that the contact ball 25 does not ride beyond the ends of the sliding contact members 54.

The object of providing the steps 42 and 43 is to prevent arcing during opening and closing of the contact members by allowing the contact ball 25 to snap into the pockets formed by the steps at the time the ball engages the contacts for actuation thereof.

Figure 10:
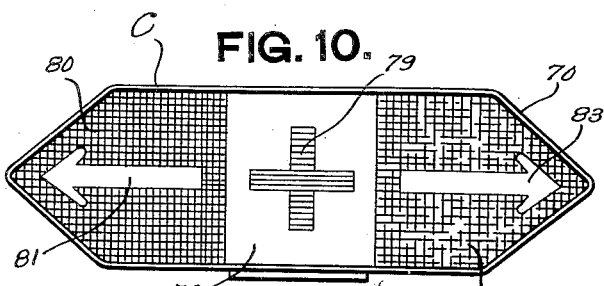
Figure 10 is a plan view of a signal casing.
Figure 11:
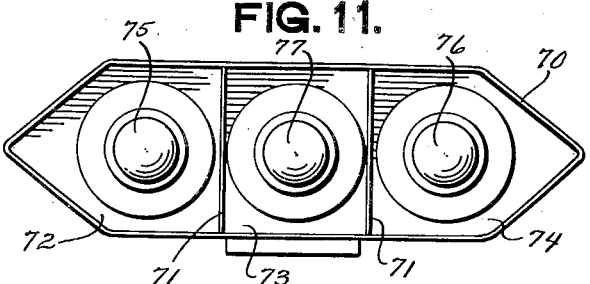
Figure 11 is a view of the signal casing showing the cover plate removed.

Referring particularly to Figures 10 and 11, and wherein is shown the preferred form of visual indicator for use with the circuit controlling device A, the indicator comprises a lamp housing or casing 70 divided by the partitions 71 into three lamp compartments 72, 73 and 74. The casing 70 is preferably provided with pointed ends altho the casing may be of any desired or preferred shape. Arranged within the compartment 72 is a signal lamp 75 providing the left turn signal lamp, while provided in the compartment 74 is a signal lamp 76 providing a right turn signal lamp. The center compartment 73 is provided with a caution signal lamp 77 which is illuminated prior to illumination of either of the direction signal lamps 75 and 76 and extinguished at the instant either of the lamps 75 or 76 is illuminated. The center compartment 73 is preferably provided with a transparent or white glass panel 78 on which is provided a cross 79 which may be black or any other suitable dark color and this center panel together with the lamp 77 forms a caution signal to be displayed in advance of the direction signals at either side thereof. The left direction signal compartment 72 may be closed by a panel 80 which may be colored blue and having marked thereon a preferably white arrow 81 pointing toward the end of the casing and in the direction of the proposed turn of the vehicle. The right direction signal compartment 74 may be closed by a panel 82 which may be colored green or yellow and having a white arrow 83 pointing in an opposite direction from that of the arrow 81. While the caution signal and direction signals have been shown included in a single casing, if so desired, the caution signal and direction signals may be separate units.

Referring now to the wiring diagram shown in Figure 12, while a single wire, ground return system has been shown, a two wire system could be employed if so desired. In the circuit arrangement shown, the battery 85 forming the source of electrical energy for illuminating the signal lamps is grounded at one side to the vehicle frame as at 86. The switch arm 22 is grounded to the mounting plate 8 and bracket 11 to the vehicle frame as at 87. The opposite terminal of the battery 85 is connected by the wires 88 to one terminal of each of the signal lamps 75, 76 and 77. The left direction signal lamp 75 is connected by the line wire 90 to the contact terminal 64 while the right direction signal lamp 76 is connected by the line wire 91 to the contact terminal 65. The caution signal lamp 77 is connected by the line wire 92 to each of the contacts 52 so that movement of the contact arm 22 in either direction from an off position will complete an electrical circuit to the caution signal lamp 77.

In the automatic operation of the signal for first displaying a caution signal in advance of any actual turning of the vehicle other than from a substantially straight course of travel and then displaying a direction signal to indicate the direction in which the vehicle will turn, the system is entirely automatically controlled from the steering mechanism as to the completing and opening of electrical circuits to the indicator. During normal forward travel of the vehicle in a substantially straight path, deviation of travel for moving from one traffic lane to another only moves the contact ball 25 along the insulating track portion 44 and the ball does not contact with either of the pivoted contact members 48. Upon further turning of the vehicle, say to the left, the contact ball 25 snaps into the pocket formed by the first step 42 at the left of the center off position and strikes the inner cammed surface of the contact 48 and swings the contact finger 51 into engagement with the inner end of the contact terminal 52 whereby an electrical circuit is completed to the caution signal lamp 77. Continued turning of the vehicle to the left moves the contact arm 22 in the direction of the arrow shown in Figure 5 until the contact ball 25 rides off of the step 43 allowing the contact 48 to open and at the same instant shifting the sliding contact member 54 longitudinally thru engagement of the contact ball with the cam projection 58 and causing the beveled edge of the notch 62 to contact with the contact terminal 64 so that a circuit is completed to the left direction signal lamp 75. The contact ball 25 as will be noted forms electrical connection between the contact members and the body of the contact device 20 which is grounded to the vehicle frame. With the circuit to the lamp 75 closed the switch arm 22 may be further swung in the direction of the arrow in Figure 6 for completing the turn and this direction of movement of the switch arm holds the sliding contact in electrical contact with the terminal 64 until a reverse or return movement of the arm is caused by return of the steering mechanism to a straight forward position. At the beginning of return movement of the switch arm to an off position, the sliding contact is moved toward its pivoted contact thus opening the circuit to the direction signal lamp and this opening of the circuit is insured when the switch arm in its return movement engages the cam projection 58. As the contact ball rides over the pivoted contact members in the return movement of the switch arm, the circuit is not again completed to the caution signal to cause confusion to persons observing the indicator. This closing of the caution signal upon return movement of the switch arm is prevented by the cam surfaces of the pivoted contact members and by reason of the contact ball engaging an end of the shallow insulating track portion 44 at the step 42 when riding off the cam surface during swinging movement of the switch arm toward the off position.

When the steering arm 14 is swung in a direction for causing the vehicle to turn to the right, the switch arm 22 will be swung to the right of the central insulating track portion 44, first engaging and actuating the pivoted contact member 48 for closing the circuit to the caution signal light 77 and then engaging and actuating the sliding right signal contact member 54 for closing the circuit to the right turn direction signal light 76.

Referring particularly to Figure 9, the swinging contact device 20 is provided with means whereby a delayed movement of the switch arm 22 may be had and allow for greater deviation of the vehicle from a straight path in either direction before completing the caution signal circuit. This delayed movement is provided by an adjustable lost motion connection between the hub portion 21 and switch arm 22 which permits limited movement of the hub portion by the sector 28 prior to the imparting of movement to the switch arm. The inner end of the switch arm 22 is provided at opposite sides of the coupling screw or pin 23 with extensions 100 thru each of which is threaded an adjustment screw 101 provided with a locking nut 102 for retaining the screws in an adjusted position. These adjustment screws 101 extend in converging relation toward the pivot bolt 18 and are intended to engage stop shoulders 103 which act to limit swinging movement of the switch arm 22 in either direction on the combined pivot and coupling pin 23. By turning both of the screws 101 into engagement with their stop shoulders 103 as in Figure 1, the switch arm 22 is rigidly connected for movement with the hub portion 21 with no lost motion between the members 21 and 22. In Figure 9 it will be noted that the steering arm 14 may swing for a limited degree in either direction from a central position before the contact ball 25 will be moved from its off position in the recess or depression 41. This delayed movement of the contact ball 25 will allow for slightly greater movement of the vehicle steering mechanism from a straight ahead position before operation of the caution signal.

While only one of the indicators C has been shown and described, two or more of the indicators may be connected in the system for display at both the front and rear of the vehicle. To accomplish this use of a number of the indicators would merely require connecting additional signal lamps in series with the signal lamps 75, 76 and 77, and providing signal casings therefore.

With the foregoing description and operation of the device in mind, it will be seen that a vehicle direction signalling system has been disclosed which will be entirely automatic in its operation for displaying first a caution signal prior to any actual turning of the vehicle other than from a substantially straight path of travel, and then a direction signal indicating the direction in which the vehicle is to turn. It will also be observed that the arrangement provides means whereby display of the caution signal is prevented during return of the single contact arm to an off or neutral position and thus preventing confusion in the minds of persons observing the signal.

Changes in detail may be made to the form of invention herein shown and described, without departing from the spirit of the invention or the scope of the following claims.

I claim:

1. In automatic vehicle signalling apparatus, including a caution signal lamp and right and left direction signal lamps, circuit controlling means for the signal lamps comprising a pivoted contact member operable by the vehicle steering means, a pair of pivoted contacts arranged one at each side of the neutral point of the contact member for controlling the caution signal lamp, and a sliding contact mounted beyond each of the pivoted contacts in the path of movement of the contact member for selectively controlling each of the direction signal lamps, said contact member moving the pivoted and then the sliding contacts into circuit closing position in its movement in either direction from the neutral position.

2. In automatic vehicle signalling apparatus, including a caution signal lamp and right and left direction signal lamps, circuit controlling means comprising a pivoted switch arm operable to either side of a neutral position by the vehicle steering means, a movable caution signal lamp contact mounted at each side of the neutral position of the switch arm, a contact terminal for each contact, spring means normally urging the contacts out of engagement with the contact terminals, said contacts being moved into electrical contact with their contact terminals by the switch arm in its direction of movement away from the neutral position, a sliding direction signal lamp contact beyond each of the caution signal lamp contacts, a contact terminal for each of the sliding contacts, said sliding contacts being moved into circuit closing relation with their respective terminal contacts by the switch arm, and spring means normally urging the sliding contacts to an open circuit position.

3. In a circuit controlling device for vehicle signals, a casing including a carrier ring, a switch arm pivotally mounted in the casing, a contact pivotally mounted in the carrier ring at each side of the neutral off position of the switch arm, a contact terminal for each pivoted contact, spring means normally urging the contacts out of engagement with their terminal contacts, a sliding contact mounted in the carrier ring beyond each of the pivoted contacts, a contact terminal for each sliding contact, spring means normally urging the sliding contacts out of engagement with their terminal contacts, said pivoted and sliding contacts having cam edges engageable by the switch arm for actuating the contacts, and means for imparting swinging movement to the switch arm.

4. In a circuit controlling device for vehicle signals, a switch casing including an annular insulating ring, a pair of contacts pivotally mounted in spaced relation inwardly of the ring and having inner cam edges, a switch arm pivotally mounted in the casing and having a spring urged contact at its free end for engaging the cam edges of the pivoted contacts, a terminal contact for each pivoted contact, spring means normally urging the pivoted contacts out of engagement with the terminal contacts, said pivoted contacts being closed thru movement of the switch arm from its neutral position between the pivoted contacts, a sliding contact mounted in the ring beyond each pivoted contact and each having a cam inner edge, a terminal contact for each sliding contact, spring means normally urging the sliding contacts toward the pivoted contacts and out of engagement with their terminal contacts, said cam edges of the sliding contacts causing longitudinal movement of the sliding contacts by the switch arm in the direction of movement of the switch arm along the cam edge, and means for swinging the switch arm to either side from a neutral position between the pivoted contacts.

5. In a vehicle signal switch, a casing including an annular insulating ring provided with an internal track groove having a neutral track portion intermediate its ends, a pivoted and a sliding contact member mounted in the groove at each side of the neutral portion, a terminal contact for each contact member, spring means normally urging the contact members out of engagement with their respective terminal contacts, and a contact device pivotally mounted in the casing including a telescoping switch arm movable along the track groove for closing the contact members in either direction of movement from the neutral track portion.

6. In a vehicle signal switch, a casing including an annular insulating ring provided with an internal track groove having a neutral track portion intermediate its ends, a cam contact member pivotally mounted in the groove at each side of the neutral track portion, a contact terminal for each cam contact, springs normally holding the cam contacts in an open position, a sliding contact mounted in each end portion of the groove and having a cam surface at their inner edges, a contact terminal for each sliding contact, springs normally holding the sliding contacts in an open position, a contact device pivotally mounted in the casing including an extensible switch arm for movement at its free end along the track groove to actuate the cam and sliding contacts in its direction of movement toward the ends of the groove, and means for imparting swinging movement to the contact device.

7. In a vehicle signal switch, a casing including an annular insulating ring provided with an internal track groove having a neutral track portion intermediate its ends, a contact member pivotally mounted in the groove at each side of the neutral track portion and each having a cam surface provided at its inner edge, a fixed contact for each pivoted contact, coil springs normally urging the pivoted contacts out of engagement with their fixed contacts, an elongated contact slidably mounted in each end portion of the groove having a cam surface along their inner edges and having a notch at their outer edges provided with a beveled side, a fixed contact for each sliding contact and projecting into said notches, coil springs normally urging the sliding contacts toward the pivoted contacts, and a switch arm pivotally mounted in the casing and having its free end adapted for travel in the track groove, said switch arm being pivoted on an axis below the axial center of the insulating ring on a line in diametric alignment with the center of the neutral track portion.

8. In a vehicle signal switch, a casing having an annular insulating ring provided with an internal track groove having a neutral track portion intermediate its ends, a pair of independently movable contacts mounted in the groove at each side of the neutral track portion and having cam edges, and a contact device pivotally mounted in the casing and having a spring urged contact ball at its free end engageable with said cam edges for actuating the contacts upon swinging movement of the contact device.

9. In a vehicle signal switch, a casing including an annular insulating ring provided with an internal track groove having a neutral track portion intermediate its ends, a pair of cam actuated contact members mounted in the groove at each side of the neutral track portion, said neutral track portion having a depression midway its ends, a hub member pivotally mounted in the casing, means for imparting swinging movement to the hub member, a hollow switch arm pivotally carried by the hub member on an axis parallel to the axis of the hub member, adjusting screws carried by the switch arm and engageable with the hub member to permit limited swinging of the switch arm on the hub member, and a spring urged contact ball mounted in the outer end of the switch arm to travel in said track groove for actuating said contact members, said contact ball to engage in said depression to provide a delayed movement of the switch arm by the hub member.

10. In a vehicle signal switch, a casing having an annular insulating ring provided with an internal track groove having a neutral track portion midway of its ends, a pivoted and a sliding contact mounted in the groove at each side of the neutral track portion and each having a cam surface at its inner edge, and a contact device pivotally mounted in the casing including a tubular switch arm, a cup member telescopically fitting into the outer end of the switch arm, a spring normally urging the cup outwardly toward the contacts, and a spring urged ball fitting in the outer end of the cup for moving in said track groove to engage the cam surfaces of the contacts for actuation thereof.

JOHN EMMANUEL TSAVARIS.